United States Patent
Chiou et al.

(10) Patent No.: US 10,161,053 B2
(45) Date of Patent: Dec. 25, 2018

(54) CONTROL SYSTEM FOR AN ELECTROLYTIC CELL

(71) Applicant: National Chiao Tung University, Hsinchu (TW)

(72) Inventors: Jin-Chern Chiou, Hsinchu (TW); Pao-Yuan Chang, Taipei (TW); Yu-Chieh Huang, Kaohsiung (TW); Chin-Cheng Wu, Taipei (TW); Huang-Yuan Chang, Taipei (TW)

(73) Assignee: National Chiao Tung University, Hsinchu (TW)

( * ) Notice: Subject to any disclaimer, the term of this patent is extended or adjusted under 35 U.S.C. 154(b) by 505 days.

(21) Appl. No.: 14/951,582

(22) Filed: Nov. 25, 2015

(65) Prior Publication Data

US 2016/0326659 A1 Nov. 10, 2016

(30) Foreign Application Priority Data

May 6, 2015 (TW) .............................. 104114457 A

(51) Int. Cl.
C25B 1/04 (2006.01)
C25B 15/02 (2006.01)

(52) U.S. Cl.
CPC ................ C25B 15/02 (2013.01); C25B 1/04 (2013.01); *Y02E 60/366* (2013.01)

(58) Field of Classification Search
CPC .............. C25B 15/02; C25B 1/02; C25B 1/04
See application file for complete search history.

(56) References Cited

U.S. PATENT DOCUMENTS

2011/0220516 A1* 9/2011 Finfrock .................. C25B 1/04
205/628

FOREIGN PATENT DOCUMENTS

| TW | M353851 U | 4/2009 |
| TW | M455767 U1 | 6/2013 |
| TW | I439322 B | 6/2014 |

OTHER PUBLICATIONS

Dragica Lj. Stojic, Milica P. Marceta, etc, "Hydrogen generation from water electrolysis—possibilities of energy saving," in Journal of Power Sources 118(2003), pp. 315-319.

Takami Iida, Hisayoshi Matsushima, and Yasuhiro Fukunaka, "Water Electrolysis under a Magnetic Field," in Journal of The Electrochemical Society (8) E112-E115 (2007).

Ming-Yuan Lin, Lih-Wu Hourng, Chan-Wei Kuo, "The effect of magnetic force on hydrogen production efficiency in water electrolysis," in International Journal of Hydrogen Energy 37(2012), pp. 1311-1320.

* cited by examiner

*Primary Examiner* — Nicholas A Smith

(74) *Attorney, Agent, or Firm* — Michael Best & Friedrich LLP

(57) ABSTRACT

A control system for an electrolytic cell includes a voltage converter converting an input voltage into a decomposition voltage, a temperature sensor generating a sensed temperature, an electric power sensor generating a sensed voltage, and a control unit storing voltage-temperature characteristics. The control unit determines a voltage that corresponds to the sensed temperature according to one of the voltage-temperature characteristics, and generates, according to a difference between the voltage thus determined and the sensed voltage, a control signal which is provided to the voltage converter such that the decomposition voltage decreases along with increase in the sensed temperature.

8 Claims, 5 Drawing Sheets

CONTROL SYSTEM FOR AN ELECTROLYTIC CELL

CROSS-REFERENCE TO RELATED APPLICATION

This application claims priority of Taiwanese Patent Application No. 104114457, filed on May 6, 2015.

FIELD

The disclosure relates to a system, more particularly to a control system for an electrolytic cell.

BACKGROUND

Electrolysis of water results in oxyhydrogen (i.e., HHO or Hydroxy gas), water vapor and few water drops. Oxyhydrogen has high commercial value. For example, the high combustibility of the oxyhydrogen which when introduced into cylinders may lead to effects of high-efficiency combustion and clearance of carbon deposit in an engine. Another example is an oxyhydrogen torch which burns hydrogen with oxygen for welding purposes. Recently, the oxyhydrogen is purified and is to be inhaled directly, or is to be mixed with distilled water to result in hydrogen water for use in human body so as to achieve an effect of health care. These examples are common applications of oxyhydrogen.

However, during the process of generating the oxyhydrogen by applying a voltage to an electrolytic cell for electrolysis of water, the electrolytic cell often overheats due to continuous usage. Under this circumstance, function of the electrolytic cell may degenerate, and the proportion of water vapor generated by the electrolytic cell is far greater than that of the oxyhydrogen generated thereby.

SUMMARY

Therefore, an object of the disclosure is to provide a control system for an electrolytic cell which mitigates a rise of temperature of the electrolytic cell and stabilizes generation of the oxyhydrogen during electrolysis procedure therein.

In a first aspect according to the disclosure, the control system is adapted for an electrolytic cell. The electrolytic cell contains an electrolyte for carrying out electrolysis of the electrolyte when a decomposition voltage is applied thereto. The control system includes a voltage converter, a temperature sensor, an electric power sensor and a control unit.

The voltage converter is to be coupled electrically to the electrolytic cell, receives a control signal and an input voltage, and converts, according to the control signal, the input voltage into the decomposition voltage which is to be provided to the electrolytic cell. The temperature sensor senses a temperature of the electrolytic cell to generate a sensed temperature. The electric power sensor is to be coupled electrically to the electrolytic cell, and measures the decomposition voltage to generate a sensed voltage. The control unit is coupled electrically to the voltage converter, the temperature sensor for receiving the sensed temperature and the electric power sensor for receiving the sensed voltage, and includes a characteristic library. The characteristic library stores a plurality of voltage-temperature characteristics each of which corresponds to a respective electric current and records different temperatures and corresponding voltages. The temperature is negatively correlated to the voltages.

When receiving an instruction signal which assigns a designated current at which the electrolytic cell operates, the control unit determines one of the voltages that corresponds to the sensed temperature according to one of the voltage-temperature characteristics corresponding to the designated current, and generates, according to a difference between said one of the voltages thus determined and the sensed voltage, the control signal which is provided to the voltage converter such that the decomposition voltage decreases along with increase in the sensed temperature.

In a second aspect according to the disclosure, the control system is adapted for an electrolytic cell. The electrolytic cell contains an electrolyte for carrying out electrolysis of the electrolyte when a decomposition voltage is applied thereto. The control system includes a voltage converter, a temperature sensor, an electric power sensor and a control unit.

The voltage converter is to be coupled electrically to the electrolytic cell, receives a control signal and an input voltage, and converts, according to the control signal, the input voltage into the decomposition voltage which is to be provided to the electrolytic cell. The temperature sensor senses a temperature of the electrolytic cell to generate a sensed temperature. The electric power sensor is to be coupled electrically to the electrolytic cell, and measures a decomposition current flowing through the electrolytic cell to generate a sensed electric current. The control unit is coupled electrically to the voltage converter, the temperature sensor for receiving the sensed temperature and the electric power sensor for receiving the sensed electric current, and includes a characteristic library. The characteristic library stores a plurality of voltage-temperature characteristics each of which corresponds to a respective electric current and records different temperatures and corresponding voltages, and stores a plurality of first impedance-temperature characteristics each of which corresponds to the respective electric current and records different temperatures and corresponding electrical impedances. The temperature is negatively correlated to the voltage. The temperature is negatively correlated to the electrical impedance.

When receiving an instruction signal which assigns a designated current at which the electrolytic cell operates, the control unit determines one of the voltages that corresponds to the sensed temperature according to one of the voltage-temperature characteristics corresponding to the designated current, determines one of the electrical impedances that corresponds to the sensed temperature according to one of the first impedance-temperature characteristics corresponding to the designated current, calculates the decomposition voltage corresponding to the sensed electric current according to the sensed electric current and said one of the electrical impedances thus determined, and generates, according to a difference between said one of the voltages thus determined and the decomposition voltage thus calculated, the control signal which is provided to said voltage converter such that the decomposition voltage decreases along with increase in the sensed temperature.

An effect of this disclosure resides in that, by means of cooperation among the electric power sensor, the temperature sensor, the control unit and the characteristic library, the control unit generates the control signal to enable the decomposition voltage to decrease along with increase in the temperature so that the decomposition current is kept stable.

Moreover, the increase in temperature of the electrolytic cell may be mitigated for constant generation of oxyhydrogen.

BRIEF DESCRIPTION OF THE DRAWINGS

Other features and advantages of the disclosure will become apparent in the following detailed description of embodiments with reference to the accompanying drawings, of which.

DETAILED DESCRIPTION

Figure 1:
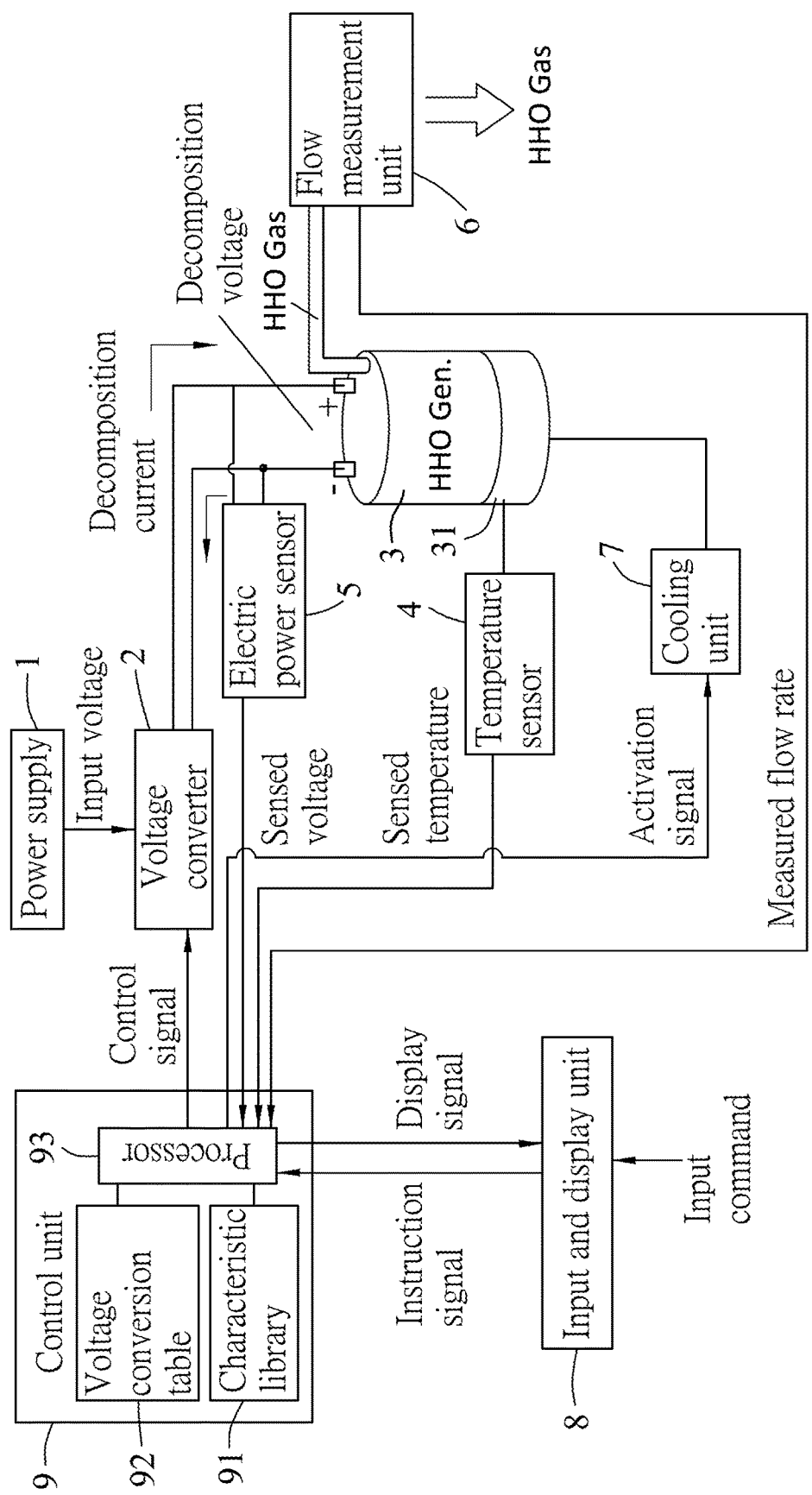
FIG. 1 is a block diagram illustrating a first embodiment of a control system for an electrolytic cell according to the disclosure.

Before this disclosure is described in greater detail with reference to the accompanying embodiments, it should be noted herein that like elements are denoted by the same reference numerals throughout the disclosure.

Referring to FIG. 1, a first embodiment of a control system for an electrolytic cell 3 according to this disclosure includes a power supply 1, a voltage converter 2, a temperature sensor 4, an electric power sensor 5, a flow measurement unit 6, a cooling unit 7, an input and display unit 8 and a control unit 9. The control unit 9, based on user input, is operable to enable the electrolytic cell 3 to remain at a stable temperature or to have the temperature rise rapidly during electrolysis procedure. Moreover, when the temperature of the electrolytic cell 3 exceeds a limiting temperature, the control unit 9 further enables the electrolytic cell 3 to lower its temperature.

The power supply 1 is configured to output an input voltage.

The voltage converter 2 is coupled electrically to the power supply 1 for receiving the input voltage. The voltage converter 2 is configured to receive a control signal, and to convert, according to the control signal, the input voltage into a decomposition voltage which is to be provided to the electrolytic cell 3.

The electrolytic cell 3 contains an electrolyte 31, is coupled electrically to the voltage converter 2 for carrying out electrolysis of the electrolyte 31 when the decomposition voltage from the voltage converter 2 is applied thereto. A current flowing from the voltage converter 2 through the electrolytic cell 3 is a decomposition current. The decomposition voltage divided by the decomposition current results in a decomposition impedance. In this embodiment, the electrolyte 31 is distilled water. Electrolysis of the distilled water results in oxyhydrogen, water vapor and few water drops, and the oxyhydrogen is outputted at an outlet tube located near an anode of the electrolytic cell 3.

The temperature sensor 4 is configured to sense the temperature of the electrolytic cell 3 to generate a sensed temperature.

The electric power sensor 5 is to be coupled electrically to the electrolytic cell 3, and is configured to measure the decomposition voltage to generate a sensed voltage.

The flow measurement unit 6 is to be coupled to the electrolytic cell 3 and is coupled electrically to the control unit 9. The flow measurement unit 6 is configured to measure a flow rate of a gas generated by the electrolytic cell 3 to generate a measured flow rate which is provided to the control unit 9.

The cooling unit 7 is to be coupled to the electrolytic cell 3 and is coupled electrically to the control unit 9 for receiving an activation signal from the control unit 9 such that the cooling unit 7 is activated to lower the temperature of the electrolytic cell 3. In this embodiment, the electrolytic cell 3 includes an inner tank and an outer tank (not shown). The inner tank contains the electrolyte 31, and the outer tank contains a liquid. The cooling unit 7 includes a motor (not shown) coupled to the outer tank. When the cooling unit 7 receives the activation signal, the motor is activated, so that the liquid contained in the outer tank is pumped out from the outer tank, is cooled, and is pumped back into the outer tank. In this way, an effect of temperature reduction on the electrolytic cell 3 can be achieved.

The input and display unit 8 is coupled electrically to the control unit 9. The input and display unit 8 is operable to generate an instruction signal according to user input of an input command, and receives at least one display signal for display of information contained in the display signal to inform the user of the same. In this embodiment, the input and display unit 8 is exemplified as one of a notebook computer provided with Internet compatibility and a desktop computer including a display in combination with a keyboard.

The control unit 9 includes a characteristic library 91, a voltage conversion table 92 and a processor 93.

The characteristic library 91 stores a plurality of voltage-temperature characteristics (see FIG. 2) each of which corresponds to a respective electric current (e.g., $I_1$, $I_2$ and $I_3$) and records different temperatures and corresponding voltages. It is evident that for each characteristic curve shown in FIG. 2, the temperature is negatively correlated to the voltage. The characteristic library 91 further stores a plurality of current-temperature characteristics (see FIG. 3) each of which corresponds to a respective voltage (e.g., $V_1$, $V_2$ and $V_3$) and records different temperatures and corresponding electric currents. It is evident that for each characteristic curve shown in FIG. 3, the temperature is positively correlated to the electric current. The characteristic library 91 further stores a plurality of first impedance-temperature characteristics (see FIG. 4) each of which corresponds to the respective electric current (e.g., $I_1$ and $I_2$) and records different temperatures and corresponding electrical impedances, and stores a plurality of second impedance-temperature characteristics (see FIG. 4) each of which corresponds to the respective voltage (e.g., $V_1$ and $V_2$) and records different temperatures and corresponding electrical impedances. As is evident from the characteristic curves shown in FIG. 4, the temperature is negatively correlated to the electrical impedance.

The voltage conversion table 92 records a plurality of voltage differences and corresponding control parameters.

The processor 93 is coupled electrically to the voltage converter 2, the characteristic library 91 and the voltage conversion table 92, the temperature sensor 4, the electric power sensor 5, the flow measurement unit 6, the cooling unit 7, and the input and display unit 8.

Figure 2:
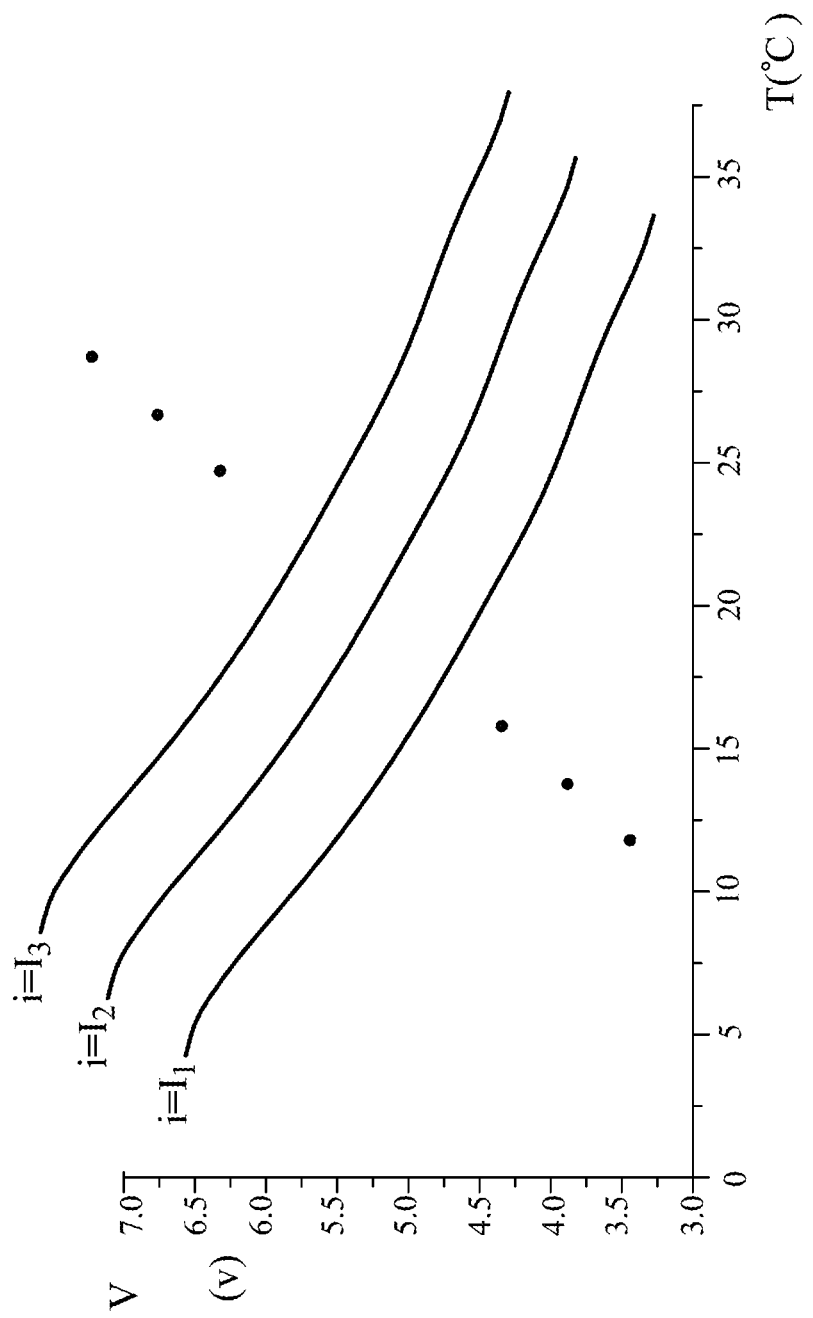
FIG. 2 is a plot illustrating an embodiment of voltage-temperature characteristics each of which corresponds to a respective electric current under a constant current operation mode of the control system.

Referring to FIG. 1 and FIG. 2, since the decomposition impedance decreases along with the increase in the temperature in the electrolytic cell 3, under a condition that the decomposition voltage applied to the electrolytic cell 3 is constant, the decomposition current flowing through the electrolytic cell 3 increases along with the increase in the temperature. The increase in the decomposition current results in further increment of the temperature of the electrolytic cell 3, so that this vicious circle has a detrimental result.

Therefore, when the temperature and the decomposition current in the electrolytic cell 3 are desired to remain constant, a corresponding input command may be inputted by the user, and the processor 93 receives from the input and display unit 8 the instruction signal which assigns a designated current at which the electrolytic cell 3 operates. The processor 93 is programmed to further receive the sensed temperature from the temperature sensor 4, and the sensed voltage from the electric power sensor 5. The processor 93 is programmed to determine one of the voltage-temperature characteristics that corresponds to the designated current in the characteristic library 91 according to the instruction signal, to determine one of the voltages that corresponds to the sensed temperature according to said one of the voltage-temperature characteristics thus determined and the sensed temperature, and to determine one of the voltage differences that is identical to a difference between said one of the voltages thus determined and the sensed voltage according to the voltage conversion table 92, so as to generate the control signal according to one of the control parameters corresponding to said one of the voltage differences in the voltage conversion table 92. The control signal is subsequently provided to the voltage converter 2. Moreover, the processor 93 is programmed to convert the sensed temperature, the sensed voltage, the measured flow rate, and said one of the voltages that corresponds to the sensed temperature into the display signal which is to be provided to the input and display unit 8 for display thereon to inform the user of the same. In this way, even if the decomposition impedance decreases along with the increase in the temperature, the decomposition voltage which is provided to the electrolytic cell 3 and which is controlled by the control unit 9 also decreases along with the increase in the temperature, so that the decomposition current may remain constant for preventing the vicious circle of increase in temperature.

Figure 3:
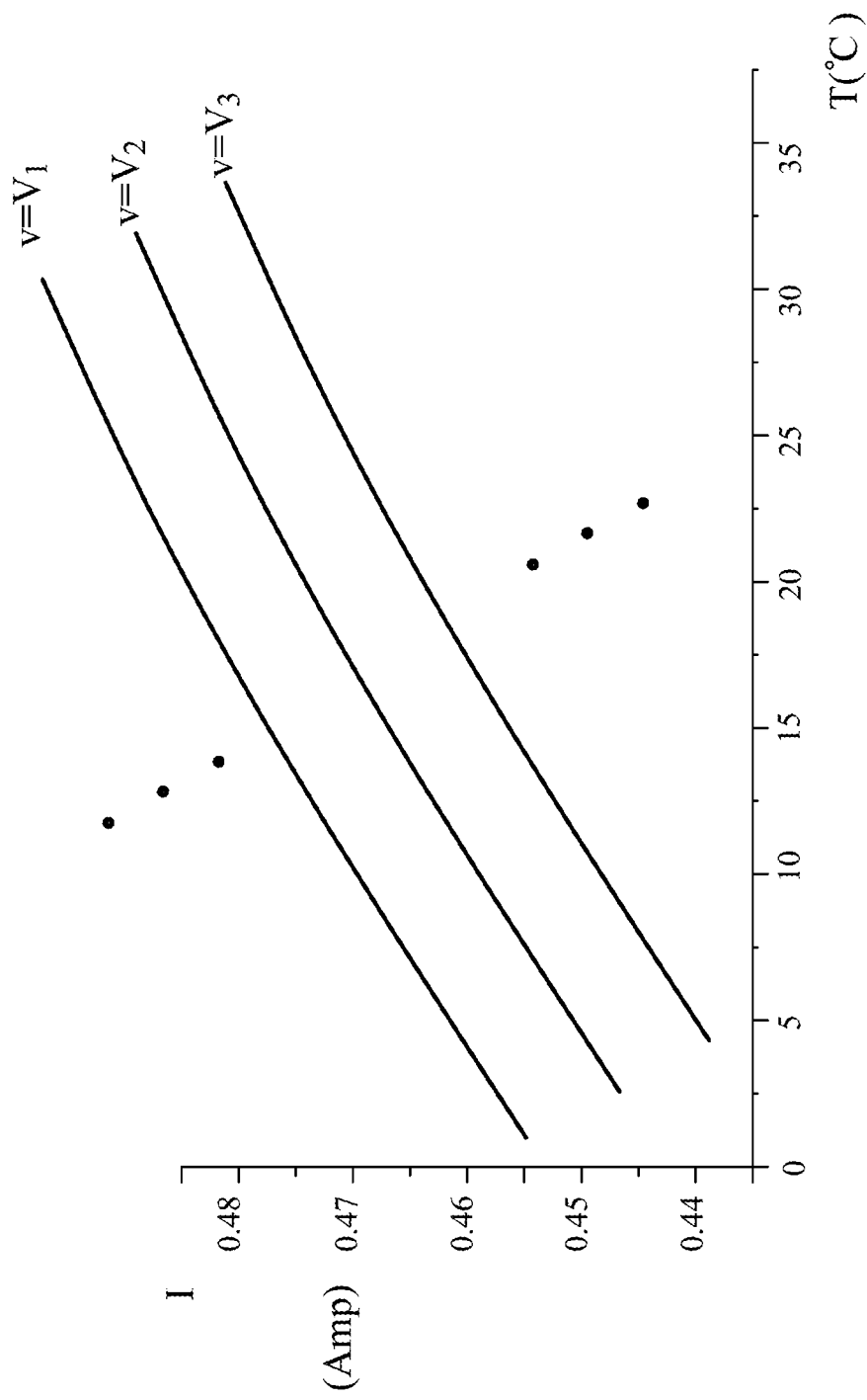
FIG. 3 is a plot illustrating an embodiment of current-temperature characteristics each of which corresponds to a respective voltage under a constant voltage operation mode of the control system.

Referring to FIG. 1 and FIG. 3, since the yield of product obtained during the electrolytic procedure is positively proportional to the decomposition current, the decomposition current may be promoted to accelerate the electrolysis procedure of the electrolytic cell 3. When a constant temperature of the electrolytic cell 3 is desired and when the decomposition current is desired to first rise rapidly to a limiting current, a corresponding input command may be inputted by the user, and the processor 93 receives from the input and display unit 8 the instruction signal which assigns a designated voltage and a limiting current at which the electrolytic cell 3 operates. The processor 93 is programmed to further receive the sensed temperature and the sensed voltage. The processor 93 is programmed to determine one of the current-temperature characteristics that corresponds to the designated voltage in the characteristic library 91 according to the instruction signal, to determine one of the electric currents that corresponds to the sensed temperature according to said one of the current-temperature characteristics thus determined and the sensed temperature, and to determine one of the voltage differences that is identical to a difference between the designated voltage and the sensed voltage according to the voltage conversion table 92, so as to generate the control signal according to one of the control parameters corresponding to said one of the voltage differences in the voltage conversion table 92. The control signal is subsequently provided to the voltage converter 2, such that the decomposition voltage is maintained at the designated voltage until said one of the electric currents that corresponds to the sensed temperature is equal to the limiting current. Finally, the decomposition current may be maintained based on the aforementioned approach, such that the electrolysis procedure may continue stably in the electrolytic cell 3 under the most favorable condition of the decomposition current.

Moreover, the processor 93 stores the limiting temperature. The instruction signal is transmitted to the processor 93 by the input and display unit 8 in response to the user input so as to set the limiting temperature. The processor 93 is programmed such that when the processor 93 determines that the sensed temperature received from the temperature sensor 4 is greater than the limiting temperature stored thereby, the processor 93 generates the activation signal to the cooling unit 7 such that the cooling unit 7 is activated to reduce the temperature of the electrolytic cell 3.

Accordingly, relationships between the temperature of the electrolytic cell 3, the decomposition voltage, the decomposition current and the decomposition impedance are observed in advance, and an input command associated with these relationships is inputted by using the input and display unit 8, such that the characteristic library 91 is able to be established in the control unit 9. In this way, when the electrolytic cell 3 is operating, based on different operating modes desired by the user, the processor 93 is programmed to determined which one of the voltage-temperature characteristics and the current-temperature characteristics is to be referenced, so as to control the electrolytic cell 3 to maintain a stable temperature or to raise the temperature rapidly during the electrolysis procedure. In this embodiment, two physical phenomena, that the decomposition impedance 31 of the electrolysis 31 decreases along with the increase in the temperature and that the yield of product obtained during the electrolytic procedure is positively proportional to the decomposition current, serve as a basis. By virtue of the control unit 9, two different operating modes of the electrolysis procedure, i.e., the constant decomposition voltage and the constant decomposition current, may be selected for the electrolytic cell 3 so as to achieve the objects of temperature control of the electrolytic cell 3 and yield control of the electrolysis procedure.

It is noted that each of the voltage-temperature characteristics, the current-temperature characteristics, the first impedance-temperature characteristics and the second impedance-temperature characteristics stored in the characteristic library 91 include plural entries of relationships between the different temperatures and the corresponding voltages, the corresponding electric currents or the corresponding electrical impedances. The processor 93 is programmed to determine a corresponding one of the voltages, a corresponding one of the electric currents, or a corresponding one of the electrical impedances in a manner of referring to a lookup table.

Alternatively, each of the voltage-temperature characteristics, the current-temperature characteristics, the first impedance-temperature characteristics and the second impedance-temperature characteristics stored in the characteristic library 91 may include a respective predetermined approximate function of a curve which is associated with the different temperatures and the corresponding voltages, the corresponding electric currents or the corresponding electrical impedances. The processor 93 may be programmed to determine a corresponding one of the voltages, a corresponding one of the electric currents, or a corresponding one of the electrical impedances in a manner of inputting the sensed temperature into the respective approximate function.

Figure 4:
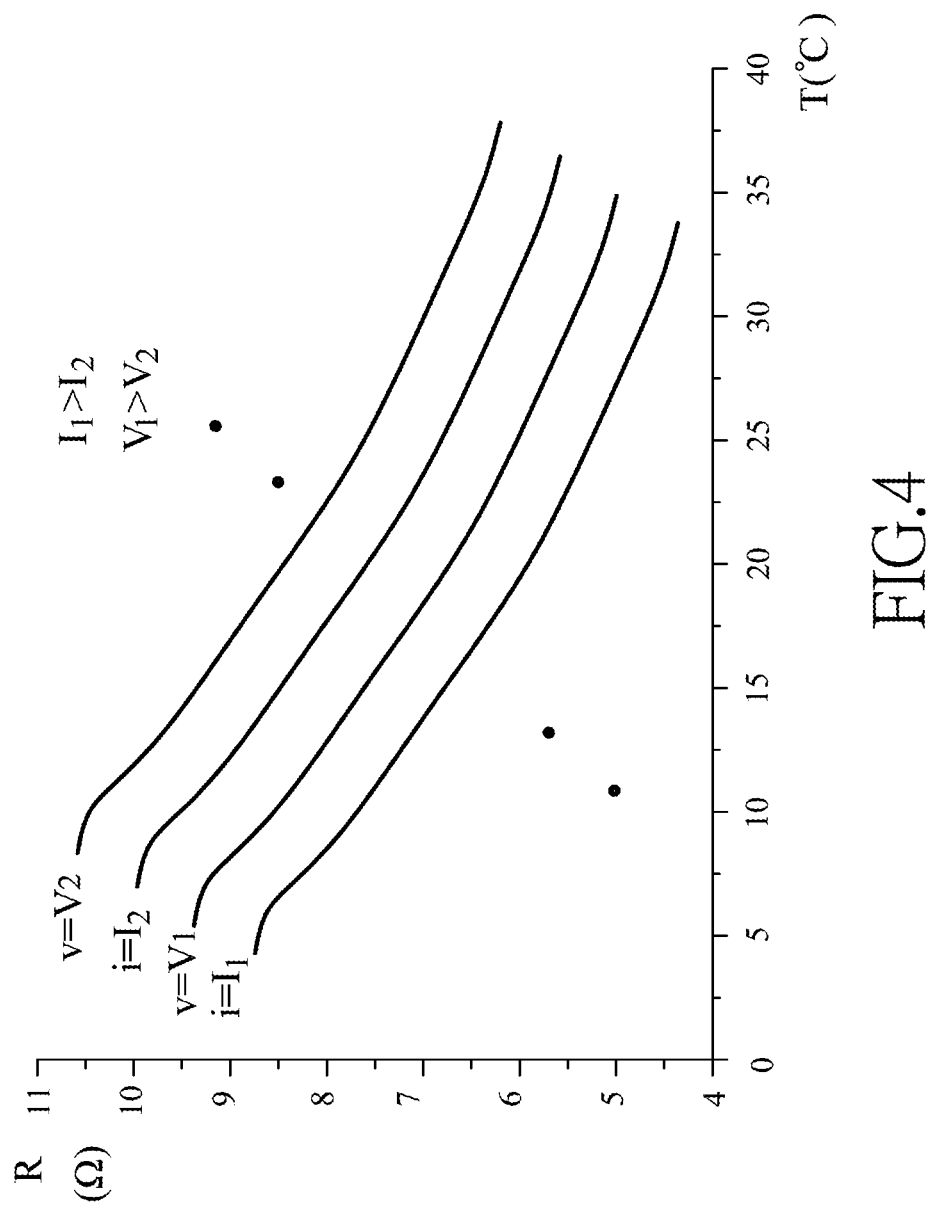
FIG. 4 is a plot illustrating an embodiment of first impedance-temperature characteristics and second impedance-temperature characteristics according to the disclosure.
Figure 5:
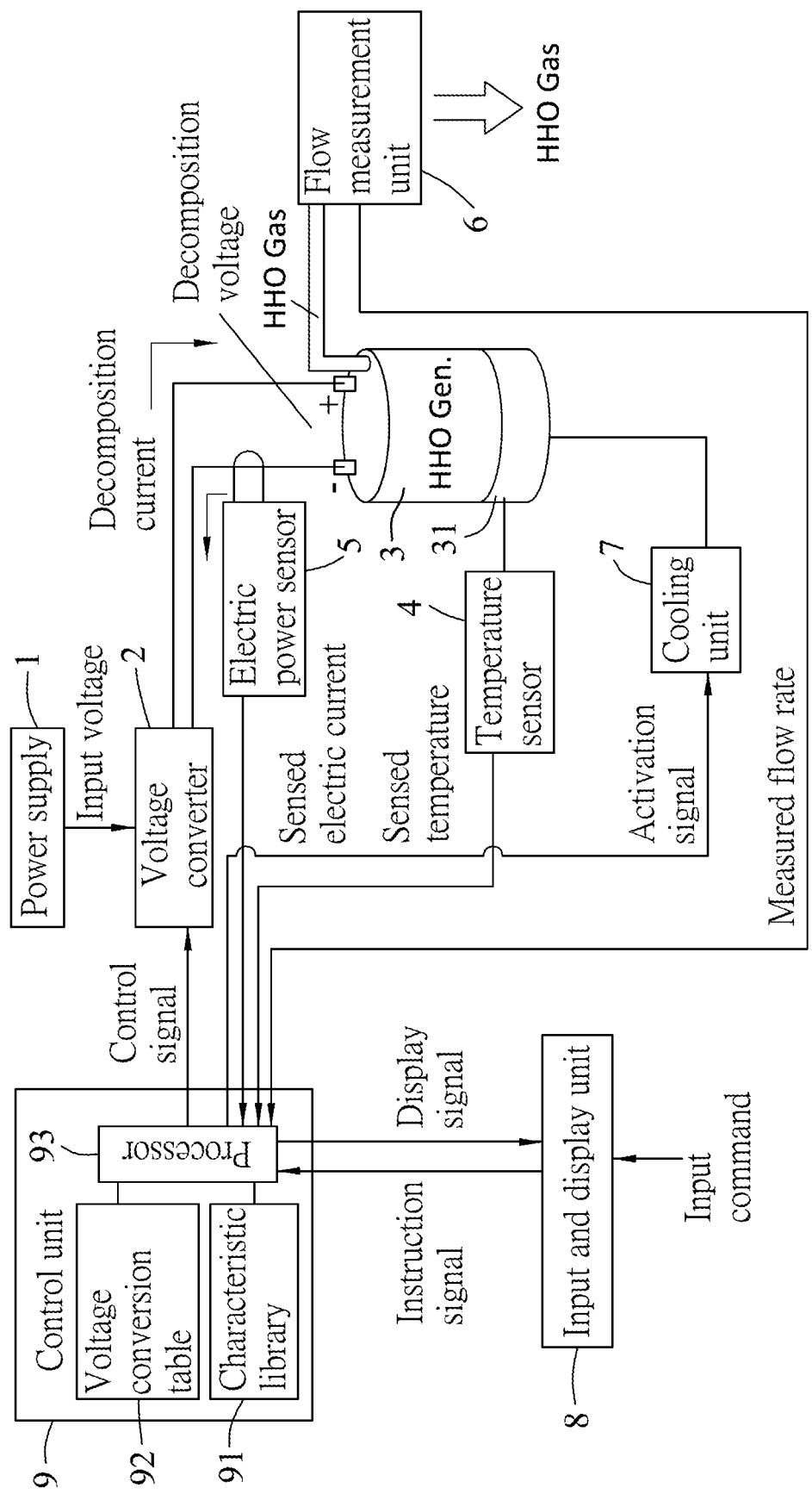
FIG. 5 is a block diagram illustrating a second embodiment of the control system for an electrolytic cell according to the disclosure.

Referring to FIG. 4 and FIG. 5, a second embodiment of the control system for an electrolytic cell 3 according to the disclosure is similar to the first embodiment, and differs from the first embodiment in that the electric power sensor 5 is configured to measure the decomposition current flowing through the electrolytic cell 3 to generate a sensed electric current.

When the temperature and the decomposition current in the electrolytic cell 3 are desired to be constant, the processor 93 receives the instruction signal which assigns a designated current at which the electrolytic cell 3 operates. The processor 93 is programmed to further receive the sensed temperature and the sensed electric current. The processor is programmed to determine one of the voltages that corresponds to the sensed temperature according to one of the voltage-temperature characteristics that corresponds to the designated current, to determine one of the electrical impedances that corresponds to the sensed temperature according to one of the first impedance-temperature characteristics that corresponds to the designated current, and to calculate the decomposition voltage corresponding to the sensed electric current according to the sensed electric current and said one of the electrical impedances thus determined. The processor 93 is further programmed to generate, according to a difference between said one of the voltages thus determined and the decomposition voltage thus calculated and according to the voltage conversion table 92, the control signal that corresponds to the voltage difference identical to the difference therebetween. The control signal is subsequently provided to the voltage converter 2.

When the temperature of the electrolytic cell 3 is desired to be constant and when the decomposition current is desired to first rise rapidly to a limiting current, the processor 93 receives the instruction signal which assigns a designated voltage and a limiting current at which the electrolytic cell 3 operates. The processor 93 is programmed to further receive the sensed temperature and the sensed electric current. The processor 93 is programmed to determine one of the electrical impedances that corresponds to the sensed temperature according to one of the second impedance-temperature characteristics corresponding to the designated voltage, and to calculate the decomposition voltage corresponding to the sensed electric current according to the sensed electric current and said one of the electrical impedances thus determined. The processor 93 is further programmed to generate, according to a difference between the designated voltage and the decomposition voltage thus calculated, the control signal which is provided to the voltage converter 2 such that the decomposition voltage is maintained at the designated voltage until the sensed electric current is equal to the limiting current.

Accordingly, the sensed electric current of the second embodiment may be converted into the decomposition voltage based on the first impedance-temperature characteristics and the second impedance-temperature characteristics stored in the characteristic library 91.

To sum up, by means of cooperation among the electric power sensor 5, the temperature sensor 4, the processor 93 and the characteristic library 91, the processor 93 generates the control signal to use the decomposition voltage to control the decomposition current to remain stable or to rise rapidly. When the decomposition current is maintained at a constant, the increase in temperature of the electrolytic cell 3 may be mitigated so that the electrolytic cell 3 is able to generate products (e.g., oxyhydrogen) stably. When the decomposition current rises rapidly to the limiting current, the electrolysis procedure of the electrolytic cell 3 may be accelerated so that the yield of the product obtained during the electrolytic procedure may be promoted.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A control system for an electrolytic cell, the electrolytic cell containing an electrolyte for carrying out electrolysis of the electrolyte when a decomposition voltage is applied thereto, the control system comprising:
a voltage converter to be coupled electrically to the electrolytic cell, receiving a control signal and an input voltage, and converting, according to the control signal, the input voltage into the decomposition voltage which is to be provided to the electrolytic cell;
a temperature sensor sensing a temperature of the electrolytic cell to generate a sensed temperature;
an electric power sensor to be coupled electrically to the electrolytic cell, and measuring a decomposition current flowing through the electrolytic cell to generate a sensed electric current; and
a control unit coupled electrically to said voltage converter, said temperature sensor for receiving the sensed temperature and said electric power sensor for receiving the sensed electric current, and including a characteristic library, said characteristic library storing a plurality of voltage-temperature characteristics each of which corresponds to a respective electric current and records different temperatures and corresponding voltages, and storing a plurality of first impedance-temperature characteristics each of which corresponds to a respective electric current and records different temperatures and corresponding electrical impedances, where the temperature is negatively correlated to the voltage, and negatively correlated to the electrical impedance;
wherein when receiving an instruction signal which assigns a designated current at which the electrolytic cell operates, said control unit determines one of the voltages that corresponds to the sensed temperature according to one of the voltage-temperature characteristics corresponding to the designated current, determines one of the electrical impedances that corresponds to the sensed temperature according to one of the first impedance-temperature characteristics corresponding to the designated current, calculates the decomposition voltage corresponding to the sensed electric current according to the sensed electric current and said one of the electrical impedances thus determined, and generates, according to a difference between said one of the voltages thus determined and the decomposition voltage thus calculated, the control signal which is provided to said voltage converter such that the decomposition voltage decreases along with increase in the sensed temperature.

2. The control system according to claim 1, wherein said characteristic library further stores a plurality of current-temperature characteristics each of which corresponds to a respective voltage and records different temperatures and corresponding electric currents, and stores a plurality of second impedance-temperature characteristics each of which corresponds to a respective voltage and records different temperatures and corresponding electrical impedances, where the temperature is positively correlated to the electric current, and negatively correlated to the electrical impedance; and when receiving an instruction signal which assigns a designated voltage and a limiting current at which the electrolytic cell operates, said control unit determines one of the electrical impedances that corresponds to the sensed temperature according to one of the second impedance-temperature characteristics corresponding to the designated voltage, calculates the decomposition voltage corresponding to the sensed electric current according to the sensed electric current and said one of the electrical impedances thus determined, and generates, according to a difference between the designated voltage and the decomposition voltage thus calculated, the control signal which is provided to said voltage converter such that the decomposition voltage is maintained at the designated voltage until the sensed electric current is equal to the limiting current.

3. The control system according to claim 1, wherein said control unit further includes:

a voltage conversion table recording a plurality of voltage differences and corresponding control parameters; and a processor coupled electrically to said voltage converter, said characteristic library and said voltage conversion table, coupled electrically to said temperature sensor for receiving the sensed temperature, and coupled electrically to said electric power sensor for receiving the sensed electric current, said processor receiving the instruction signal, determining said one of the voltage-temperature characteristics that corresponds to the designated current in said characteristic library according to the instruction signal, determining said one of the voltages that corresponds to the sensed temperature according to said one of the voltage-temperature characteristics thus determined and the sensed temperature, calculating the decomposition voltage corresponding to the sensed electric current according to the sensed electric current and said one of the electrical impedances thus determined, and determining one of the voltage differences that is identical to the difference between said one of the voltages thus determined and the decomposition voltage thus calculated according to the voltage conversion table, so as to generate the control signal according to one of the control parameters corresponding to said one of the voltage differences in the voltage conversion table.

4. The control system according to claim 1, further comprising a cooling unit to be coupled to the electrolytic cell and coupled electrically to said control unit, said control unit storing a limiting temperature, wherein when the sensed temperature received from said temperature sensor is greater than the limiting temperature thus stored, said control unit generates an activation signal to be outputted to said cooling unit such that said cooling unit is activated to reduce the temperature of the electrolytic cell.

5. The control system according to claim 1, further comprising a flow measurement unit to be coupled to the electrolytic cell and coupled electrically to said control unit, said flow measurement unit measuring a flow rate of a gas generated by the electrolytic cell to generate a measured flow rate which is provided to said control unit.

6. The control system according to claim 5, further comprising an input and display unit coupled electrically to said control unit, said input and display unit being operable to generate the instruction signal according to user input of an input command, said control unit converting the sensed temperature, the sensed electric current, the measured flow rate, and said one of the voltages that corresponds to the sensed temperature into a display signal which is to be provided to said input and display unit for display thereon.

7. The control system according to claim 1, wherein each of the voltage-temperature characteristics stored in said characteristic library includes plural entries of relationships between the different temperatures and the corresponding voltages, said control unit determining a corresponding one of the voltages in a manner of referring to a lookup table.

8. The control system according to claim 1, wherein each of the voltage-temperature characteristics stored in said characteristic library includes a predetermined approximate function of a curve which is associated with the different temperatures and the corresponding voltages, said control unit determining a corresponding one of the voltages in a manner of inputting the sensed temperature into the approximate function.

\* \* \* \* \*